US009630255B2

(12) United States Patent
Shimamoto et al.

(10) Patent No.: US 9,630,255 B2
(45) Date of Patent: Apr. 25, 2017

(54) CUTTING-OFF PROCESSING TOOL

(71) Applicant: SUMITOMO ELECTRIC HARDMETAL CORP., Itami-shi, Hyogo (JP)

(72) Inventors: Yosuke Shimamoto, Itami (JP); Tomoyuki Fukuyama, Itami (JP); Masanobu Ueda, Itami (JP)

(73) Assignee: SUMITOMO ELECTRIC HARDMETAL CORP., Itami-shi (JP)

( * ) Notice: Subject to any disclaimer, the term of this patent is extended or adjusted under 35 U.S.C. 154(b) by 210 days.

(21) Appl. No.: 14/378,164

(22) PCT Filed: Sep. 18, 2013

(86) PCT No.: PCT/JP2013/075088
§ 371 (c)(1),
(2) Date: Aug. 12, 2014

(87) PCT Pub. No.: WO2014/065046
PCT Pub. Date: May 1, 2014

(65) Prior Publication Data
US 2015/0056029 A1    Feb. 26, 2015

(30) Foreign Application Priority Data
Oct. 26, 2012  (JP) ................. 2012-236470

(51) Int. Cl.
*B23B 27/04*      (2006.01)
(52) U.S. Cl.
CPC ...... *B23B 27/045* (2013.01); *B23B 2200/083* (2013.01); *B23B 2200/087* (2013.01);
(Continued)

(58) Field of Classification Search
CPC ........ B23B 2200/083; B23B 2200/087; B23B 2200/286; B23B 2200/321; B23B 27/045;
(Continued)

(56) References Cited

U.S. PATENT DOCUMENTS 2,392,001 A    1/1946  Raper
2,677,170 A    5/1954  Kuns
(Continued)

FOREIGN PATENT DOCUMENTS

CN    1774318 A    5/2006
CN    1867416 A    11/2006
(Continued)

OTHER PUBLICATIONS

Sep. 30, 2015 Office Action issued in Chinese Patent Application No. 201380011088.0.
(Continued)

*Primary Examiner* — Sara Addisu
(74) *Attorney, Agent, or Firm* — Oliff PLC

(57) ABSTRACT

An object of the present invention is to configure a cutting-off processing tool that includes a cutting edge angled at an end cutting edge angle and causes evacuation of chips to be controlled so that the chips are evacuated in the tool axis direction, thereby reducing concerns about damage to a processed surface by the chips. The cutting-off processing tool includes a cutting edge angled at the end cutting edge angle. In the cutting-off processing tool, an upper surface has a shape laterally asymmetric about a center in a width direction. In the cutting-off processing tool, when θb is a rake angle of a rake face on a first corner side positioned on a foremost end of the tool, and θc is a rake angle of the rake face on a second corner side, θb>θc is satisfied.

5 Claims, 4 Drawing Sheets

(52) U.S. Cl.
CPC ... *B23B 2200/286* (2013.01); *B23B 2200/321* (2013.01); *Y10T 407/24* (2015.01)

(58) Field of Classification Search
CPC ... B23B 27/04; B23B 27/043; B23B 27/1607; B23B 27/1603; B23B 2200/323; B23B 2200/125; B23B 2200/12; B23B 27/141; B23B 27/065
USPC .......................................... 407/113–117, 120
See application file for complete search history.

(56) References Cited

U.S. PATENT DOCUMENTS

| | | | | |
|---|---|---|---|---|
| 4,778,311 A | | 10/1988 | Niemi | |
| 4,880,338 A | * | 11/1989 | Stashko | B23B 27/143 407/114 |
| 4,969,779 A | * | 11/1990 | Barten | B23B 27/045 407/114 |
| 5,040,930 A | * | 8/1991 | Zinner | B23B 27/045 407/114 |
| 5,137,396 A | | 8/1992 | Durschinger | |
| 5,807,031 A | * | 9/1998 | Arai | B23C 5/202 407/113 |
| 5,921,722 A | * | 7/1999 | Paya | B23B 27/143 407/113 |
| 6,742,971 B2 | * | 6/2004 | Tong | B23B 27/045 407/113 |
| 6,986,626 B2 | * | 1/2006 | Gati | B23B 27/045 407/113 |
| 7,883,300 B1 | * | 2/2011 | Simpson, III | B23B 27/045 407/113 |
| 8,366,355 B2 | * | 2/2013 | Nagaya | B23B 27/04 407/113 |
| 8,770,895 B2 | * | 7/2014 | Inoue | B23B 27/045 407/113 |
| 2002/0197119 A1 | * | 12/2002 | Kinukawa | B23B 27/045 407/114 |
| 2009/0226269 A1 | * | 9/2009 | Iyori | B23B 27/143 407/114 |
| 2010/0061815 A1 | | 3/2010 | Inoue | |
| 2011/0070039 A1 | * | 3/2011 | Park | B23B 27/141 407/113 |
| 2012/0210834 A1 | | 8/2012 | Onodera | |
| 2014/0248098 A1 | * | 9/2014 | Pacheri | B23B 27/1607 407/114 |
| 2015/0224581 A1 | * | 8/2015 | Tsuda | B23B 27/045 407/66 |
| 2016/0271703 A1 | * | 9/2016 | Inoue | B23B 27/045 |

FOREIGN PATENT DOCUMENTS

| | | |
|---|---|---|
| CN | 101528391 A | 9/2009 |
| CN | 101730601 A | 6/2010 |
| DE | 4318479 A1 | 12/1994 |
| DE | 29804257 U1 | 5/1998 |
| JP | A-01-121109 | 5/1989 |
| JP | U-7-602 | 1/1995 |
| JP | 08294803 A * | 11/1996 |
| JP | B2-2768939 | 6/1998 |
| JP | A-2005-103655 | 4/2005 |
| JP | 2006-502874 A | 1/2006 |
| JP | A-2006-231458 | 9/2006 |
| JP | 2009-012118 A | 1/2009 |
| WO | 2004/035257 A2 | 4/2004 |
| WO | 2005/035173 A1 | 4/2005 |
| WO | 2008/053633 A1 | 5/2008 |
| WO | WO 2008/117822 A1 | 10/2008 |
| WO | 2009/005218 A1 | 1/2009 |

OTHER PUBLICATIONS

Oct. 15, 2013 International Search Report issued in International Application No. PCT/JP2013/075088.
Apr. 25, 2016 Extended European Search Report issued in European Application No. 13849852.2.

* cited by examiner

CUTTING-OFF PROCESSING TOOL

TECHNICAL FIELD

The present invention relates to tools used in a cutting-off process, and in particular relates to a cutting-off processing tool that includes a cutting edge angled at an end cutting edge angle and causes evacuation of chips to be controlled so that the chips are evacuated in the tool axis direction.

BACKGROUND ART

Examples of a cutting-off processing tool include a cutting-off processing tool disclosed in the following Patent Literature 1.

The cutting-off processing tool described in Patent Literature 1 is a cutting insert having hand that includes a cutting edge angled at an end cutting edge angle. With this cutting-off processing tool, unevenness of a reactionary force against cutting force, which is applied to the cutting insert due to the effect of the end cutting edge angle, is corrected by inclining the cutting edge.

It is known that a cutting-off processing tool including a cutting edge angled at an end culling edge angle effectively addresses a problem of remaining of a projection on a workpiece, the problem arising when a cutting-off process is performed with a tool, the end cutting edge angle of which is 0°.

In a cutting-off process using a tool including a cutting edge angled at the end cutting edge angle of 0°, when part of the workpiece has not been cut yet, the workpiece is parted so as to be ripped away. As a result, a projection (unprocessed projecting part) tends to remain at the center of a processed surface of a portion of the workpiece to be cut off. In contrast, with a cutting-off processing tool, the cutting edge of which is angled at the end cutting, edge angle, cutting by a foremost end corner precedes cutting by a corner on a rear side. By doing this, the part that may otherwise remain as the projection can be cut before the workpiece is parted, thereby reducing remaining or the projection.

CITATION LIST

Patent Literature

PTL 1: Japanese Patent No. 2768939

SUMMARY OF INVENTION

Technical Problem

As described above, a cutting-off processing tool including a cutting edge angled at an end cutting edge angle effectively addresses remaining of a projection on the workpiece. However, since the cutting edge is inclined relative to a line perpendicular to the tool axis direction, chips are evacuated toward a surface of the workpiece having been processed.

Chips generated during a cutting-off process or a fluting process are typically evacuated in a direction perpendicular to the cutting edge. Thus, in a process using the cutting-off processing tool including a cutting edge angled at an end cutting edge angle, the chips are processed by a foremost end corner of the cutting edge and evacuated toward a surface on this corner side. Thus, a processed surface (surface of a flute before part of the workpiece is cut) is likely to be damaged.

The task of the present invention is to configure a cutting-off processing tool that includes a cutting edge angled at an end cutting edge angle and causes evacuation of chips to be controlled so that the chips are evacuated in the tool axis direction, thereby reducing concerns about damage to a processed surface by the chips. In the following description, among the tool axis directions, a tool axis front direction refers to a direction in which the cutting edge approaches a workpiece in the tool axis direction (cutting-off direction), and a tool axis rear direction refers to a direction in which the cutting edge is moved away from the workpiece in the tool axis direction (counter cutting-off direction).

Solution to Problem

In order to solve the above-described problem, in the present invention, a cutting-off processing tool that includes a cutting edge angled at an end cutting edge angle is configured as follows. That is, in the cutting-off processing tool, an upper surface has a shape laterally asymmetric about a center in a width direction. In the cutting-off processing tool, when θb is a rake angle of a rake face on a first corner side positioned on a foremost end of the tool, and θc is a rake angle of the rake face on a second corner side positioned on a tool axis rear direction side relative to the first corner, θb>θc is satisfied. The rake angles referred to herein are angles with the rake face that is angled at the rake angle of 0° in a section along as line parallel to the tool axis (similarly applicable hereafter).

In the cutting-off processing tool, when FL1 is a width of a first breaker projection provided on the first corner side and FL2 is as width of a second breaker projection provided on the second corner side, it is preferable that FL1<FL2 be also satisfied because, in this case, more desirable effects can be expected.

The difference between the rake angle θb on the first corner side and the rake angle θc on the second corner side is preferably equal to or greater than 2° because the effect of correction due to the angle difference is clearly produced.

The upper surface is preferably formed such that a rake angle θa of the rake face at a central portion in the tool width direction is greater than the rake angle θb on the first corner side and the rake angle θc on the second corner side. Furthermore, a breaker projection is preferably disposed on the tool axis mar direction side of the rake face.

Advantageous Effects of Invention

In the cutting-off processing tool according to the present invention, the upper surface has a shape laterally asymmetric about the center in the width direction. This causes the chip evacuation speeds on the first corner side and the second corner side to be different from each other, and the chip evacuation direction is corrected by utilizing the difference speed.

The chip evacuation speed is higher on a side where the rake angle is greater, or on a side where the width of the breaker projection is smaller out of both the sides at the front end. The reason for this is that, on the side where the rake angle is greater or on the side where the width of the breaker projection is smaller out of both the sides at the front end, chafing resistance of the chips can be reduced compared to that on the side where the rake angle is smaller or the side where the width of the breaker projection is larger.

Thus, chip evacuation, by which the chips may otherwise be evacuated toward the first corner side of the cutting edge, is corrected and the chips are directed in the tool axis direction. For this reason, chip evacuation toward the processed surface is suppressed.

Furthermore, when a breaker projection is disposed on the rear side of the rake face, the chips evacuated in the tool axis direction can be curled and parted in a preferable manner with this breaker projection. By this parting process, a situation in which the lengths of the chips are increased is suppressed, and accordingly, chip evacuation is stabilized. Thus, a situation in which the generated chips are brought into contact with the processed surface is reduced, and accordingly, the problem in thin the processed surface is damaged by the chips is suppressed.

DESCRIPTION OF EMBODIMENTS

Figure 1:
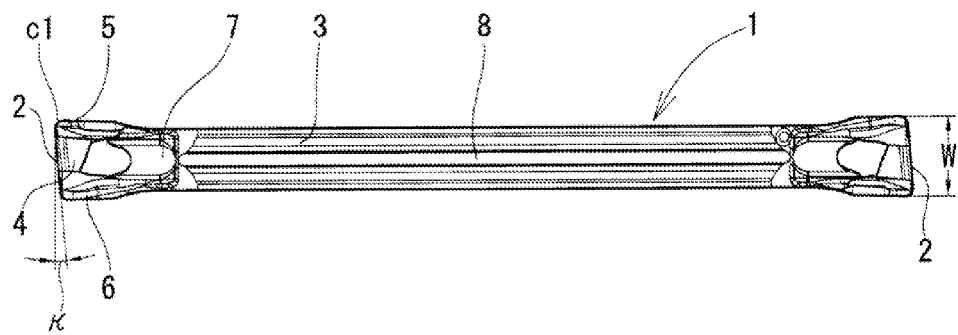
FIG. 1 is a plan view illustrating an example of a cutting-off processing tool according to the present invention.
Figure 2:
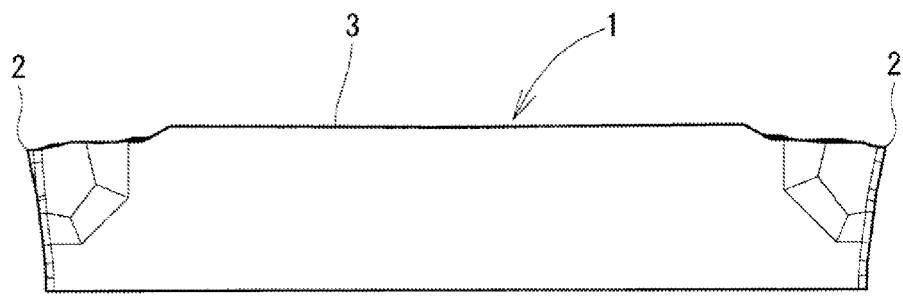
FIG. 2 is a side view of the cutting-off processing tool illustrated in FIG. 1.
Figure 3:
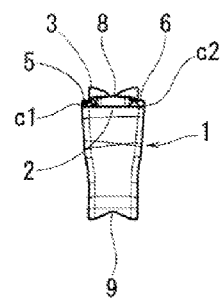
FIG. 3 is a front view of the cutting-off processing tool illustrated in FIG. 1.
Figure 4:
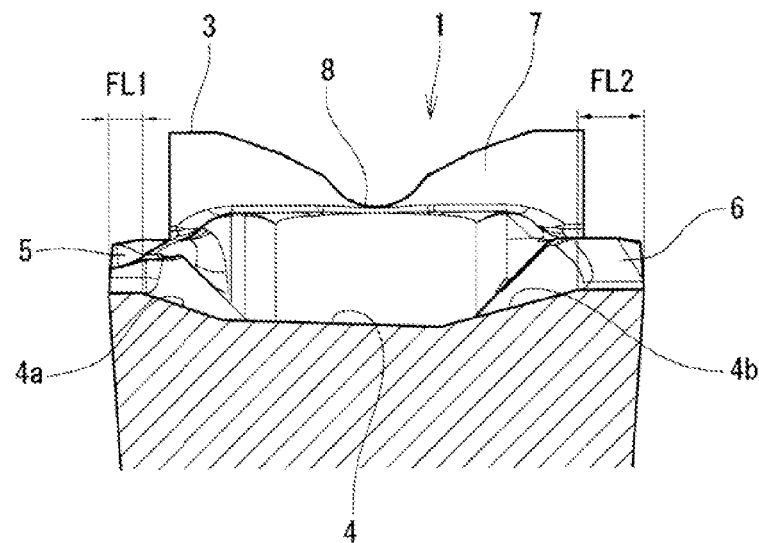
FIG. 4 is an enlarged sectional front view of a main portion of the cutting-off processing tool illustrated in FIG. 1.
Figure 5:
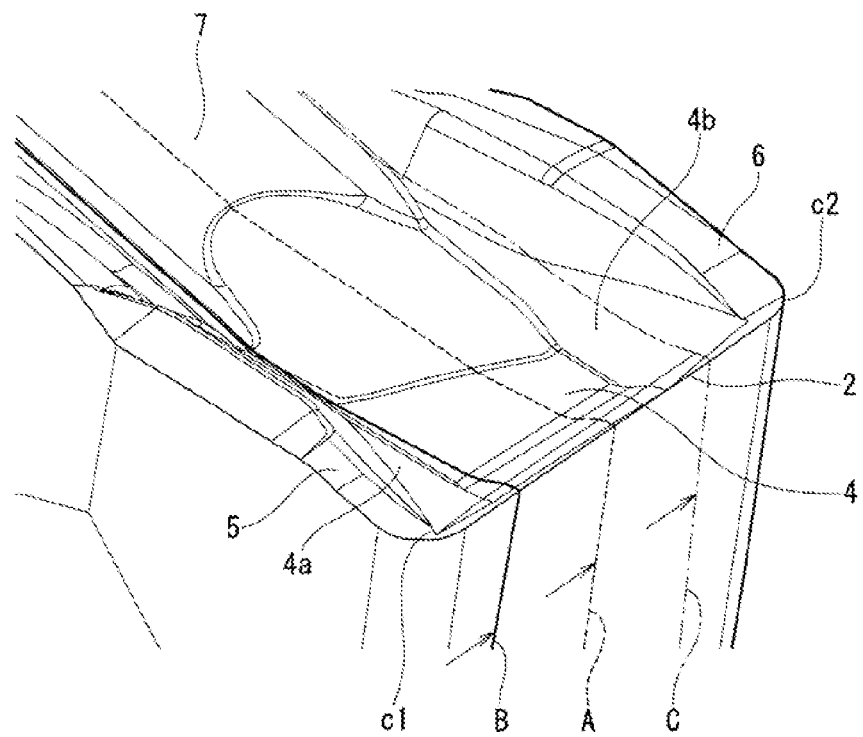
FIG. 5 is a perspective view illustrating the details of an upper surface on a front end side of the cutting-off processing tool illustrated in FIG. 1.

An embodiment of a cutting-off processing tool according to the present invention will be described below with reference to FIGS. 1 to 10. An exemplary cutting-off processing tool 1 is an edge replaceable cutting insert detachably attached to a holder (not illustrated) in use. Cutting edges 2 are provided at both ends of the tool 1 in the axial direction. In the tool 1, the shapes of the cutting edges 2 and the shapes of portions of an upper surface 3 involved in cutting at both the ends in the axial direction are substantially the same as one another. Thus, the structure on one of the end sides is described below.

First to third breaker projections 5 to 7 are provided on the upper surface 3. The first to third breaker projections 5 to 7 each have a breaker surface inclined relative to a rake face 4 by an inclination angle of 30°.

The cutting-off processing tool 1 as illustrated in the drawings is attached to a holder such as a holder disclosed in Patent Literature 1 in use, that is, a holder having an upper jaw to be in V-shaped engagement with a V-flute 8 (see FIGS. 1, 3, 4, and 7) of the upper surface 3 of the tool and a lower jaw to be in V-shaped engagement with a V-flute 9 (see FIG. 3) of as lower surface of the tool. This type or holder holds the cutting-off processing tool 1 inserted thereinto between the upper and lower jaws with a pressure applied to the cutting-off processing tool 1 from an upper jaw portion by using a bolt or the like.

Figure 7:
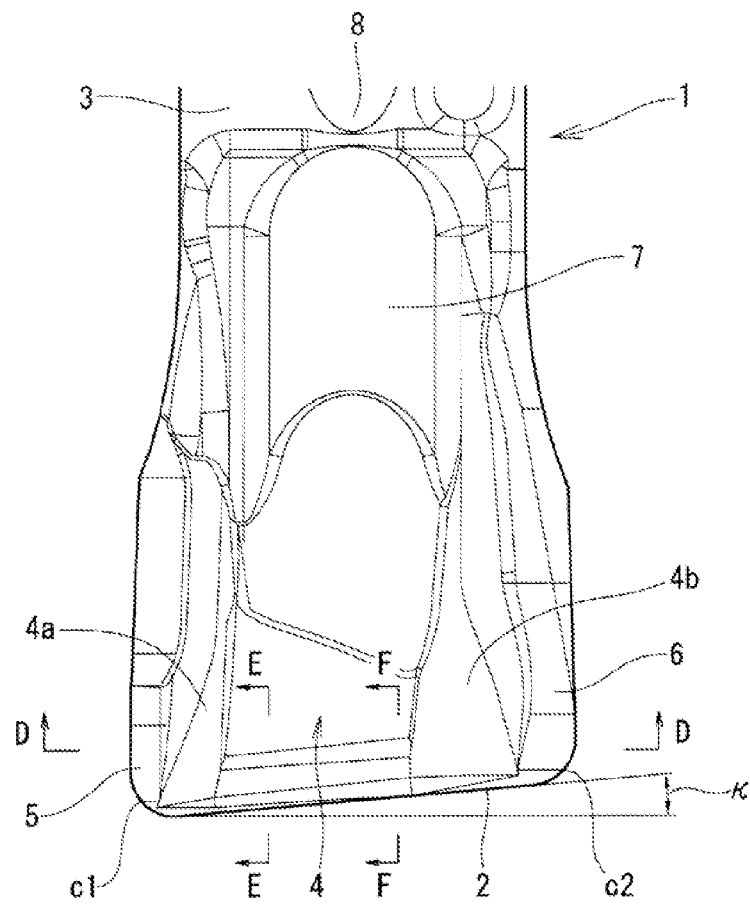
FIG. 7 is an enlarged plan view of the front end of the cutting-off processing tool illustrated in FIG. 1.

The cutting edge 2 of the cutting-off processing tool 1 is angled at an end cutting edge angle as illustrated in FIGS. 1 and 7. The cutting edge 2 has a first corner c1 and as second corner c2 respectively at one and another ends thereof file first corner c1 is positioned at a foremost end of the tool. The second corner c2 is positioned on a tool axis rear direction side relative to the first corner c1.

The entirety of the cutting edge 2 has a uniform height. The rake face 4 is provided on the upper surface 3 along the cutting edge. The first breaker projection 5 and the second breaker projection 6 are respectively provided along side surfaces on the first corner c1 side and the second corner c2 side on the upper surface 3. In addition, the third breaker projection 7, in which a small projection and an inclined surface integrated, is provided on the tool axis rear direction side relative to the rake face 4.

Figure 8:
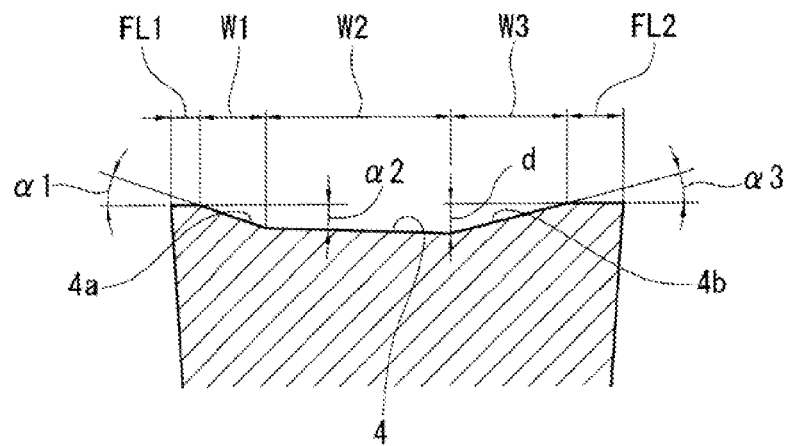
FIG. 8 is a sectional view taken along line D-D in FIG. 7.
Figure 9:
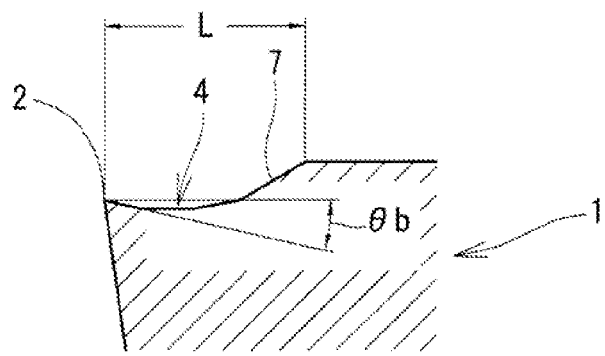
FIG. 9 is a sectional view taken along line E-E in FIG. 7.
Figure 10:
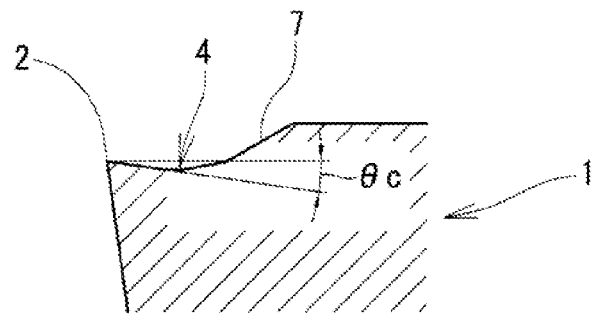
FIG. 10 is a sectional view taken along line F-F in FIG. 7.

A portion of the rake face 4 interposed between the first breaker projection 5 and the second breaker projection 6 is recessed from the cutting edge 2 position. As illustrated in FIG. 8, in the exemplary tool, a recess amount d of the rake face 4 is maximum only on the second corner c2 side.

Rake angles of a region of the rake face 4 recessed from the cutting edge 2 position, that is, the rake angle θb on the first corner side and the rake angle θc on the second corner side (see FIGS. 6 and 10) are set to values so as to satisfy the following relationship: θb>θc.

The rake angle θb on the first corner c1 side, a rake angle θa at a central portion the cutting edge, and the rake angle θc on the second corner c2 side are in the following relationships: θa>θb>θc. Preferably, these rake angles are in the following ranges:

20°≤θa≤40°,
12°≤θb≤24°, and
6°≤θc≤18°.

Although the values of the rake angle θb on the first corner c1 side and the rake angle θc on the second corner c2 side may vary in an edge width direction, the rake angle θb and the rake angle θc are preferably specified by values at positions respectively away from an end portion of the cutting edge on the first corner c1 side and away from an end portion of the cutting edge 2 on the second earner c2 side by 25% of an edge width W.

Assuming that the rake angles θb and θc are specified at end portions of the cutting edge, that is, near corner portions. This increases θb so as to increase the difference between θb and θc when a significant correction of a chip generating direction is desired. Thus, the rake angle near the corner, where the cutting edge is originally likely to be damaged, is increased. Accordingly, the likelihood of damage to the edge is increased. In contrast, when the specified positions are excessively close to the center attic edge width, the effect of the rake angles on chip generation are decreased even by increasing the difference between θb and θc. Accordingly, it is difficult to produce the effect of correcting the chip generating direction. Thus, the rake angles are preferably specified at positions away from the end portions of the cutting edge 2 by 25% of the edge width W (see FIG. 1).

Figure 6:
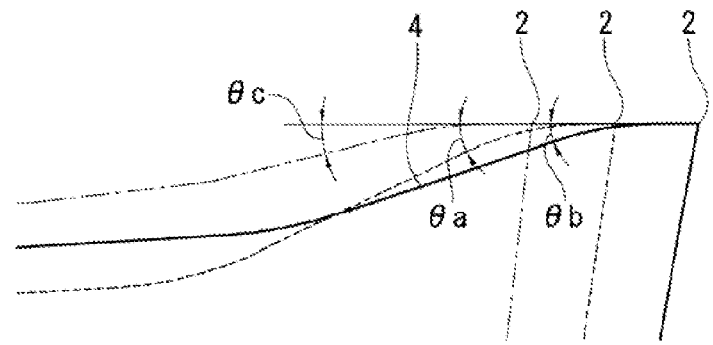
FIG. 6 illustrates sectional views taken along line A (dotted line), line B (solid line), and line C (dot-dash line) in FIG. 5 superposed with one another.

In the exemplary tool, the end cutting edge angle κ illustrated in FIGS. 1 and 7 is set to 5°, the rake angle θa illustrated in FIG. 6 is set to 30°, the rake angle θb illustrated in FIG. 6 is set to 18°, and the rake angle θc illustrated in FIG. 6 is set to 12°. However, appropriate values of θb and θc vary depending on the size of the end cutting edge angle κ, the presence and absence and the size of the first and second breaker projections 5 and 6, and so forth. When considering the effect of reducing the amount of as remaining projection of a workpiece, the end cutting edge angle κ is preferably about 5° to 15°. Although the rake angles of the rake face 4 at both side portions (between the cutting edge 2 and the first breaker projection 5 and between the cutting edge 2 and the second breaker projection 6) are set to 0°, these rake angles are not, limited to 0°.

Widths FL1 and FL2 of the first breaker projection 5 and the second breaker projection 6 illustrated in FIG. 8 are set so as to satisfy the following relationship: FL1<FL2, where FL1 and FL2 are the widths of the front end portions continuous with portions of the rake face angled at rake angles of 0° (land).

Due to this difference between the breaker widths, resistance against chip evacuation is increased on the second corner c2 side compared to that on the first corner c1 side. Also due to this increase in the resistance against the chip evacuation, the difference in the chip evacuation speed is produced between both the side portions of each chip (the evacuation speed is decreased on the second corner c2 side). This speed difference is added to the evacuation speed difference caused by the difference in the rake angles, thereby further increasing, the effect of correcting the chip evacuation direction.

The width FL1 of the first breaker projection 5, the width FL2 of the second breaker projection 6, the width W1 of an inclined surface 4a on the first breaker projection 5 side, the width W3 of an inclined surface 4b on the second breaker projection 6 side, the width W2 of the rake face between the inclined surfaces 4a and 4b, the inclination angle α1 of the inclined surface 4a, the inclination angle α3 of the inclined surface 4b, and the inclination angle α2 of the rake face 4 between the inclined surfaces 4a and 4b illustrated in FIG. 8 are preferably set in the following ranges. W represents the edge width and the following relationship is satisfied: W=FL1+FL2+W1+W2+W3. The inclination angles α1, α2, and α3 are angles with reference to a line, parallel to the cutting edge 2.

$0 \leq FL1 \leq 0.1W$,
$0 \leq FL2 \leq 0.2W$,
$0.1W \leq W1 \leq 0.2W$,
$0 \leq W2 \leq 0.5W$,
$0.15W \leq W3 \leq 0.35W$,
$12° \leq α1 \leq 24°$,
$0° \leq α2 \leq 6°$, and
$10° \leq α3 \leq 20°$.

The third breaker projection 7 is disposed on the tool axis rear direction side of the rake face 4. Although the distance L (see FIG. 9) from the cutting edge 2 to an upper end of the inclined surface of the third breaker projection 7 inclined at an inclination angle of 30° is set to 1.8 mm in the exemplary tool, this is only an example.

The example in the above description is a right-hand tool in which the first corner c1 is positioned on the right when seen in a cutting direction. However, the basic structure of a left-hand tool, the description of which is omitted, is the same as that of the right-hand tool.

Example

A prototype of the cutting-off processing tool according to the following specifications is produced: edge width W=2 mm, end cutting edge angle κ=5°, rake angles θa=30°, θb=18°, and θc=12°, front end width FL1 of first breaker projection=0.12 mm, front end width FL2 of second breaker projection=0.24 mm, and distance L from cutting edge to upper end of inclined surface of third breaker projection=1.8 mm. The cutting-off processing tool is tested under the following conditions:

Cutting conditions: cutting speed Vc=100 m/min, feed f=0.10 mm/rev.

Workpiece: SCM415.

In the testing, when feed f=0.10 mm/rev, the chips are evacuated in the tool axis direction and preferably curled and parted by the breaker projections.

When the feed f is changed to 0.20 mm/rev in the cutting-off process, the chip evacuation direction is corrected to be in the tool axis direction. Thus, it is confirmed that the structure of the present invention is effective.

The tool according to the present invention can further increase the difference between the chip evacuation speeds on the left and right when the both of the structure, in which only the left and right (on the first and second corner sides) rake angles of the rake face are different from each other, and the structure, in which only the widths of the first and second breaker projections are different from each other, are used.

Although the example of the cutting insert is replaceable in the above description, the present invention may also be applied to a tool in which a tip including a cutting edge is secured to a body of the tool or a tool in which the cutting edge is integrally formed with the body of the tool. Application of the present invention is not limited to cutting-off processing. The present invention can also be used in fluting when inclination of the bottom of a flute to be formed is allowed. It should be understood that the scope of the present invention is defined by the scope of the claims, and any modification within the scope of the claims or equivalent in meaning to the scope of the claims is included in the scope of the present invention.

REFERENCE SIGNS LIST 1 cutting-off processing tool
2 cutting edge
3 upper surface
4 rake face
4a, 4b inclined surface
5 first breaker projection
6 second breaker projection
7 third breaker projection
8, 9 V-flute
c1 first corner
c2 second corner
κ end cutting edge angle
θa rake angle at central portion of cutting edge
θb rake angle on first corner side
θc rake angle on second corner side
FL1 width of first breaker projection
FL2 width of second breaker projection
W1 width of inclined surface 4a on first breaker projection side
W2 width of rake face between inclined surfaces 4a and 4b
W3 width of inclined surface 4b on second breaker projection side
L distance from cutting, edge to upper end of inclined surface of third breaker projection
α1 inclination angle of the inclined surface 4a
α2 inclination angle of rake face 4
α3 inclination angle of inclined surface 4b
d recess amount of rake face from cutting edge position

The invention claimed is:

1. A cutting-off processing tool that includes a cutting edge inclined by an end cutting edge angle with respect to a normal to a longitudinal median plane of the cutting-off processing tool, comprising;
   a first corner positioned at a first corner side of the cutting edge and on a foremost end of the tool,
   a second corner positioned at a second corner side of the cutting edge and on a tool axis rear direction side relative to the first corner, the cutting edge extending between the first corner side and the second corner side,
   a first breaker provided on an upper surface of the cutting-off processing tool, along a side surface on the first corner side toward the tool axis rear direction, having a first width,
   a second breaker provided on the upper surface of the cutting-off processing tool, along a side surface on the second corner side toward the tool axis rear direction, having a second width which is wider than the first width,
   a rake face provided between the first corner and the second corner, having a first rake angle on the first corner side and a second rake angle on the second corner side, the second rake angle being smaller than the first rake angle,
   a first inclined surface connecting the first breaker and the rake face, and
   a second inclined surface connecting the second breaker and the rake face,
   wherein the first inclined surface, the rake face, and the second inclined surface constitute a recess when viewed from the foremost end,
   the rake face and the first inclined surface incline downwardly from the first breaker toward the second breaker and the second inclined surface incline downwardly from the second breaker toward the first breaker, an intersection of the rake face and the second inclined surface being located closer to the second corner than to the first corner.

2. The cutting-off processing tool according to claim 1, wherein a breaker projection is disposed on the tool axis rear direction side of the rake face.

3. The cutting-off processing tool according to claim 1, wherein the rake face is provided between the first breaker and the second breaker.

4. The cutting-off processing tool according to claim 1, wherein an inclination angle of the first inclined surface with respect to a surface of the first breaker is larger than an inclination angle of the rake face with respect to the surface of the first breaker, and an inclination angle of the second inclined surface with respect to a surface of the second breaker is larger than the inclination angle of the rake face with respect to the surface of the second breaker.

5. The cutting-off processing tool according to claim 1, wherein a lowest point of the recess is at the intersection of the rake face and the second inclined surface.

* * * * *